(12) United States Patent
Kurihara et al.

(10) Patent No.: US 11,873,804 B2
(45) Date of Patent: Jan. 16, 2024

(54) CAPACITY CONTROL VALVE

(71) Applicant: EAGLE INDUSTRY CO., LTD., Tokyo (JP)

(72) Inventors: Daichi Kurihara, Tokyo (JP); Yoshihiro Ogawa, Tokyo (JP); Keigo Shirafuji, Tokyo (JP); Kohei Fukudome, Tokyo (JP); Masahiro Hayama, Tokyo (JP); Takahiro Ejima, Tokyo (JP); Wataru Takahashi, Tokyo (JP)

(73) Assignee: EAGLE INDUSTRY CO., LTD.

( * ) Notice: Subject to any disclaimer, the term of this patent is extended or adjusted under 35 U.S.C. 154(b) by 785 days.

(21) Appl. No.: 16/969,175

(22) PCT Filed: Feb. 26, 2019

(86) PCT No.: PCT/JP2019/007187
§ 371 (c)(1),
(2) Date: Aug. 11, 2020

(87) PCT Pub. No.: WO2019/167912
PCT Pub. Date: Sep. 6, 2019

(65) Prior Publication Data
US 2020/0400134 A1    Dec. 24, 2020

(30) Foreign Application Priority Data
Feb. 27, 2018    (JP) .................................. 2018-033902

(51) Int. Cl.
*F04B 27/18*    (2006.01)
*F16K 31/06*    (2006.01)

(52) U.S. Cl.
CPC .......... *F04B 27/1804* (2013.01); *F16K 31/06* (2013.01); *F04B 2027/1813* (2013.01);
(Continued)

(58) Field of Classification Search
CPC .... F16K 31/061; F16K 11/161; F16K 11/105; F16K 11/065; F16K 11/0716;
(Continued)

(56) References Cited

U.S. PATENT DOCUMENTS

| | | | |
|---|---|---|---|
| 3,297,048 A | 1/1967 | Augustin | ................ B60T 17/22 |
| 4,905,477 A | 3/1990 | Kazuhiko | ............. F04B 49/225 |

(Continued)

FOREIGN PATENT DOCUMENTS

| | | | | |
|---|---|---|---|---|
| CN | 111684156 | | 9/2020 | ............. F04B 27/18 |
| EP | 1091124 | | 11/2001 | ............. F04B 27/18 |

(Continued)

OTHER PUBLICATIONS

International Search Report and Written Opinion issued in PCT/JP2019/007187, dated Apr. 23, 2019, with English translation, 16 pages.

(Continued)

*Primary Examiner* — Hailey K. Do
(74) *Attorney, Agent, or Firm* — HAYES SOLOWAY P.C.

(57) ABSTRACT

A capacity control valve for controlling a capacity of a fluid includes: a valve housing; a main valve closing and opening a communication between a Pc port and a Pd port when a main valve portion of a main valve element driven by a drive force of a solenoid comes into contact with and separates from a main valve seat; a pressure-sensitive valve which is opened by an ambient pressure; a hollow tube member which forms a part of the pressure-sensitive valve and allows the Pc port to communicate with a Ps port through a hollow communication path formed therein when the pressure-sensitive valve is opened; and an auxiliary communication path allows the Pc port to communicate with the Ps port independently of the pressure-sensitive valve, and the auxiliary communication path is configured to be able to (Continued)

increase a flow path cross-sectional area after the main valve is closed.

17 Claims, 10 Drawing Sheets

(52) U.S. Cl.
CPC .............. *F04B 2027/1827* (2013.01); *F04B 2027/1854* (2013.01); *F04B 2027/1859* (2013.01)

(58) Field of Classification Search
CPC .............. F04B 27/18; F04B 2027/1813; F04B 2027/1827; F04B 2027/1831; F04B 2027/1845; F04B 2027/185; F04B 2027/1854; F04B 2027/1859
See application file for complete search history.

(56) References Cited

U.S. PATENT DOCUMENTS

| | | | |
|---|---|---|---|
| 5,105,852 A | 4/1992 | Wagner | F04B 37/08 |
| 6,010,312 A | 1/2000 | Suitou et al. | 417/222.2 |
| 6,213,727 B1 | 4/2001 | Kawaguchi | 417/222.2 |
| 6,354,811 B1 | 3/2002 | Ota et al. | 417/222.2 |
| 6,358,017 B1 | 3/2002 | Ota et al. | 417/222.2 |
| 6,361,283 B1 | 3/2002 | Ota et al. | 417/222.2 |
| 6,385,982 B1 | 5/2002 | Ota et al. | 62/209 |
| 6,457,319 B1 | 10/2002 | Ota et al. | 62/228.3 |
| 6,485,267 B1 | 11/2002 | Imai | F04B 27/1804 |
| 7,077,380 B2 | 7/2006 | Uemura et al. | 251/129.07 |
| 7,644,729 B2 | 1/2010 | Cho | F04B 27/1804 |
| 8,021,124 B2 | 9/2011 | Umemura et al. | 417/222.2 |
| 9,181,937 B2 | 11/2015 | Ota | F04B 27/1804 |
| 9,732,874 B2 | 8/2017 | Saeki et al. | F16K 31/06 |
| 9,777,863 B2 | 10/2017 | Higashidozono | F16K 31/0624 |
| 10,823,162 B2* | 11/2020 | Kume | F04B 27/1804 |
| 11,156,301 B2 | 10/2021 | Hayama et al. | F16K 11/105 |
| 2004/0060604 A1 | 4/2004 | Uemura et al. | 137/595 |
| 2006/0218953 A1 | 10/2006 | Hirota | 62/228.5 |
| 2009/0183786 A1 | 7/2009 | Iwa et al. | 137/487.5 |
| 2012/0056113 A1 | 3/2012 | Tano et al. | F16K 31/12 |
| 2012/0198992 A1 | 8/2012 | Futakuchi et al. | 91/505 |
| 2013/0291963 A1 | 11/2013 | Futakuchi et al. | B60H 1/00485 |
| 2015/0211506 A1 | 7/2015 | Shirafuji et al. | F04B 27/1804 |
| 2015/0345655 A1 | 12/2015 | Higashidozono et al. | F16K 31/06 |
| 2017/0175726 A1* | 6/2017 | Kume | F04B 27/1804 |
| 2018/0363637 A1 | 12/2018 | Kanai et al. | F04B 27/1804 |
| 2020/0355282 A1 | 11/2020 | Hayama et al. | F16L 11/10 |
| 2021/0033081 A1 | 2/2021 | Hayama | F16K 17/048 |
| 2021/0033082 A1 | 2/2021 | Hayama et al. | F04B 27/18 |

FOREIGN PATENT DOCUMENTS

| | | | |
|---|---|---|---|
| EP | 2 784 320 | 10/2014 | F04B 27/18 |
| EP | 3 431 760 | 1/2019 | F04B 27/18 |
| EP | 3744978 | 2/2020 | F04B 27/18 |
| JP | 5-306679 | 11/1993 | F04B 27/08 |
| JP | 6-200875 | 7/1994 | F04B 27/08 |
| JP | 2000-345961 | 12/2000 | F04B 27/14 |
| JP | 2001-73939 | 3/2001 | F04B 27/14 |
| JP | 2001-132632 | 5/2001 | F04B 27/14 |
| JP | 2006-52648 | 2/2006 | F04B 27/14 |
| JP | 2006-307828 | 11/2006 | F04B 27/14 |
| JP | 4242624 | 1/2009 | F04B 49/00 |
| JP | 4700048 | 3/2011 | F04B 49/00 |
| JP | 5167121 | 12/2012 | F04B 27/14 |
| JP | 5557901 | 6/2014 | F04B 27/14 |
| JP | 2014-190247 | 10/2014 | F04B 27/14 |
| JP | 2017-129042 | 7/2017 | F04B 27/18 |
| JP | 6206274 | 10/2017 | F04B 27/18 |
| JP | 2018-40385 | 3/2018 | F16K 31/06 |
| KR | 20170093349 A * | 8/2017 | |
| WO | WO 2005095796 | 10/2005 | F04B 27/14 |
| WO | WO 2007/119380 | 10/2007 | F04B 27/14 |
| WO | WO 2014/091975 | 6/2014 | F04B 27/14 |
| WO | WO 2014/119594 | 8/2014 | F04B 27/14 |
| WO | WO 2017/057160 | 4/2017 | F04B 27/18 |
| WO | WO 2017/159553 | 9/2017 | F04B 27/18 |

OTHER PUBLICATIONS

International Preliminary Report on Patentability issued in PCT/JP2019/007187, dated Sep. 3, 2020, 8 pages.
U.S. Appl. No. 17/259,138, filed Jan. 8, 2021, Hayama et al.
U.S. Appl. No. 17/258,708, filed Jan. 7, 2021, Hayama et al.
U.S. Appl. No. 17/258,692, filed Jan. 7, 2021, Hayama et al.
U.S. Appl. No. 17/256,947, filed Dec. 29, 2020, Hayama et al.
U.S. Appl. No. 17/256,955, filed Dec. 29, 2020, Hayama et al.
U.S. Appl. No. 17/256,959, filed Dec. 29, 2020, Hayama et al.
U.S. Appl. No. 17/256,953, filed Dec. 29, 2020, Hayama et al.
U.S. Appl. No. 17/056,988, filed Nov. 19, 2020, Kurihara et al.
U.S. Appl. No. 16/967,693, filed Aug. 5, 2020, Hayama et al.
U.S. Appl. No. 16/967,692, filed Aug. 5, 2020, Hayama et al.
U.S. Appl. No. 16/962,786, filed Jul. 16, 2020, Hayama et al.
International Search Report and Written Opinion issued in PCT/JP2019/002207, dated Apr. 23, 2019, with English translation, 13 pages.
International Preliminary Report on Patentability issued in PCT/JP2019/002207, dated Jul. 28, 2020, 7 pages.
International Search Report and Written Opinion issued in PCT/JP2019/005200, dated Apr. 23, 2019, with English translation, 12 pages.
International Preliminary Report on Patentability issued in PCT/JP2019/005200, dated Aug. 18, 2020, 7 pages.
International Search Report and Written Opinion issued in PCT/JP2019/020196, dated Aug. 27, 2019, with English translation, 11 pages.
International Preliminary Report on Patentability issued in PCT/JP2019/020196, dated Nov. 24, 2020, with English translation, 6 pages.
International Search Report and Written Opinion issued in PCT/JP2019/005199, dated Apr. 23, 2019, with English translation, 12 pages.
International Preliminary Report on Patentability issued in PCT/JP2019/005199, dated Aug. 18, 2020, 4 pages.
International Search Report and Written Opinion issued in PCT/JP2019/027112, dated Oct. 15, 2019, with English translation, 10 pages.
International Preliminary Report on Patentability issued in PCT/JP2019/027112, dated Jan. 19, 2021, 4 pages.
International Search Report and Written Opinion issued in PCT/JP2019/027071, dated Oct. 15, 2019, with English translation, 12 pages.
International Preliminary Report on Patentability issued in PCT/JP2019/027071, dated Jan. 12, 2021, 4 pages.
International Search Report and Written Opinion issued in PCT/JP2019/027072, dated Oct. 8, 2019, with English translation, 10 pages.
International Preliminary Report on Patentability issued in PCT/JP2019/027072, dated Jan. 12, 2021, 4 pages.
International Search Report and Written Opinion issued in PCT/JP2019/027073, dated Oct. 15, 2019, with English translation, 10 pages.
International Preliminary Report on Patentability issued in PCT/JP2019/027073, dated Jan. 12, 2021, 4 pages.
International Search Report and Written Opinion issued in PCT/JP2019/031067, dated Oct. 15, 2019, with English translation, 18 pages.
International Preliminary Report on Patentability issued in PCT/JP2019/021067, dated Feb. 9, 2021, 6 pages.
International Search Report and Written Opinion issued in PCT/JP2019/031068, dated Oct. 15, 2019, with English translation, 13 pages.

(56) References Cited

OTHER PUBLICATIONS

International Preliminary Report on Patentability issued in PCT/JP2019/031068, dated Feb. 9, 2021, 5 pages.
International Search Report and Written Opinion issued in PCT/JP2019/031069, dated Oct. 15, 2019, with English translation, 12 pages.
International Preliminary Report on Patentability issued in PCT/JP2019/031069, dated Feb. 9, 2021, 4 pages.
European Search Report issued in corresponding European Patent Application Serial No. 19754335.8, dated Jun. 21, 2021, 11 pages.
European Search Report issued in corresponding European Patent Application Serial No. 19754129.8, dated Jun. 18, 2021, 12 pages.
European Search Report issued in corresponding European Patent Application Serial No. 19744514.1, dated Sep. 6, 2021, 9 pages.
Official Action issued in related U.S. Appl. No. 16/962,786, dated Jun. 24, 2021, 19 pages.
Notice of Allowance issued in related U.S. Appl. No. 16/962,786, dated Aug. 5, 2021, 4 pages.
European Search Report issued in corresponding European Patent Application Serial No. 19760096.8, dated Oct. 5, 2021, 9 pages.
Official Action issued in related U.S. Appl. No. 16/967,692, dated Oct. 4, 2021, 34 pages.
Chinese Official Action issued in related Application Serial No. 201980008650.1, dated Aug. 19, 2021, with translation, 8 pages.
Chinese Official Action issued in related Application Serial No. 201980012733.8, dated Sep. 2, 2021, with translation, 9 pages.
Chinese Official Action issued in related Application Serial No. 201980011652.6, dated Sep. 1, 2021, with translation, 10 pages.
Chinese Official Action issued in related Application Serial No. 201980011570.1, dated Sep. 3, 2021, with translation, 11 pages.
Korean Official Action issued in related Application Serial No. 10-2020-7024987, dated Sep. 17, 2021, with translation, 12 pages.
Official Action issued in U.S. Appl. No. 16/967,693, dated Feb. 18, 2022, 42 pages.

\* cited by examiner

CAPACITY CONTROL VALVE

TECHNICAL FIELD

The present invention relates to a capacity control valve for variably controlling a capacity or a pressure of a working fluid and relates to, for example, a capacity control valve for controlling a discharge amount of a variable displacement compressor used in an air conditioning system of an automobile in response to a pressure.

BACKGROUND ART

A variable displacement compressor used in an air conditioning system of an automobile or the like includes a rotating shaft rotationally driven by an engine, a swash plate connected the rotating shaft so that an inclination angle is variable, a compression piston connected to the swash plate, and the like and changes the inclination angle of the swash plate so that a stroke amount of the piston is changed to control a discharge amount of a fluid. The inclination angle of the swash plate can be changed continuously by appropriately controlling a pressure inside a control chamber while using a suction pressure Ps of a suction chamber sucking a fluid by using a capacity control valve driven to be opened and closed by an electromagnetic force, a discharge pressure Pd of a discharge chamber discharging a fluid pressurized by the piston, and a control pressure Pc of the control chamber accommodating the swash plate.

When the variable displacement compressor is driven continuously (hereinafter, simply referred to as a continuous driving state"), the capacity control valve is energized by a control computer and performs normal control in which a main valve element is moved in the axial direction by an electromagnetic force generated in a solenoid and a main valve is opened and closed to adjust the control pressure Pc of the control chamber.

During normal control of the capacity control valve, the pressure of the control chamber of the variable displacement compressor is appropriately controlled and the inclination angle of the swash plate with respect to the rotating shaft is continuously changed to change the stroke amount of the piston so that the discharge amount of the fluid with respect to the discharge chamber is controlled and the air conditioning system is adjusted to have desired cooling capacity.

In such a variable displacement compressor, when the variable displacement compressor is stopped and is maintained in a stop state for a long time, the suction pressure Ps, the discharge pressure Pd, and the control pressure Pc of the variable displacement compressor become uniform and the control pressure Pc and the suction pressure Ps are much higher than the control pressure Pc and the suction pressure Ps in the continuous driving state. When starting the variable displacement compressor from this state, since the control pressure Pc is much higher than that in the continuous driving state, it requires a long time until the discharge amount is controlled to be a target value. For this reason, there is a capacity control valve that discharges a fluid from the inside of the control chamber of the variable displacement compressor when starting the variable displacement compressor in a short time.

A capacity control valve 100 shown in Patent Citation 1 includes, as illustrated in FIG. 10, a valve housing 110 which is provided with a first communication path 112 communicating a first valve chamber 120 provided with a first valve seat 110a with a discharge chamber of a variable displacement compressor, a second communication path 113 communicating a second valve chamber 130 provided with a second valve seat 182a with a suction chamber of the variable displacement compressor, and a third communication path 114 communicating a third valve chamber 140 formed on the side opposite to the second valve chamber 130 in the axial direction with respect to the first valve chamber 120 with a control chamber of the variable displacement compressor, a main valve element 151 which integrally includes a first valve portion 151a coming into contact with and separating from the first valve seat 110a in the first valve chamber 120 so as to open and close the communication between the discharge chamber and the control chamber and a second valve portion 151b coming into contact with and separating from a second valve seat 182a in the second valve chamber 130 so as to open and close the communication between the control chamber and the suction chamber and performs an opening and closing operation in the opposite directions by the reciprocating movement, an intermediate communication path 155 which communicates the second valve chamber 130 with the third valve chamber 140, a pressure-sensitive element 160 which is disposed inside the third valve chamber 140 and applies a biasing force to the main valve element 151 in the main valve opening direction in response to an ambient fluid pressure, an adapter 170 which is provided in a free end of the pressure-sensitive element 160 in the extending and contracting direction and includes an annular pressure-sensitive valve portion 170a coming into contact with and separating from a pressure-sensitive valve seat 152a integrally provided in the main valve element 151 so as to close and open the communication between the third valve chamber 140 and the intermediate communication path 155, an auxiliary communication path 190 which always communicates the inside of the third valve chamber 140 formed in the adapter 170 with the intermediate communication path 155, and a solenoid 180 which applies a drive force to the main valve element 151.

If the solenoid 180 of the capacity control valve 100 is energized and the main valve element 151 moves in the axial direction when starting the variable displacement compressor, the first valve portion 151a closes the main valve and the second valve portion 151b opens the second valve so that a communication flow path extending from the third valve chamber 140 to the second valve chamber 130 is formed inside the valve housing 110 by the auxiliary communication path 190 and the intermediate communication path 155. Further, since the suction pressure Ps of the suction chamber decreases as the variable displacement compressor is started, the high-pressure fluid in the control chamber moves due to a pressure difference with the suction chamber and passes through a flow path formed inside the valve housing 110 so as to be discharged in a short time.

CITATION LIST

Patent Literature

Patent Citation 1: JP 5167121 B2 (Page 6, FIG. 2)

SUMMARY OF INVENTION

Technical Problem

However, in Patent Citation 1, since the inside of the third valve chamber 140 always communicates with the intermediate communication path 155 by the auxiliary communication path 190 formed in the adapter 170 during the normal control of the capacity control valve 100, the fluid of the control chamber easily flows into the suction chamber through the auxiliary communication path 190 and the intermediate communication path 155 while the main valve is closed. For that reason, there is a problem that the control accuracy of the control pressure Pc by the capacity control valve 100 deteriorates even when the main valve is closed.

The present invention has been made in view of such problems and an object of the present invention is to provide a capacity control valve having good responsiveness during start-up and good control accuracy during normal control.

Solution to Problem

In order to solve the foregoing problems, a capacity control valve according to of the present invention includes: a valve housing provided with a Pc port through which a control fluid of a control pressure passes, a Pd port through which a discharge fluid of a discharge pressure passes and a Ps port through which a suction fluid of a suction pressure passes; a main valve formed by a main valve seat and a main valve element having a main valve portion, the main valve being capable of closing and opening a communication between the Pc port and the Pd port when the main valve portion of the main valve element driven by a drive force of a solenoid comes into contact with and separates from the main valve seat; a pressure-sensitive valve which is opened by an ambient pressure; a hollow tube member which forms a part of the pressure-sensitive valve and allows the Pc port to communicate with the Ps port through a hollow communication path formed therein when the pressure-sensitive valve is opened; and an auxiliary communication path which allows the Pc port to communicate with the Ps port independently of the pressure-sensitive valve. The auxiliary communication path is configured to be able to increase a flow path cross-sectional area thereof after the main valve is closed. According to the aforesaid feature, it is possible to promptly discharge a fluid by increasing the flow path cross-sectional area of the auxiliary communication path during the start-up of the variable displacement compressor and to increase controllability by decreasing the flow path cross-sectional area of the auxiliary communication path during normal control.

It might be preferable that the flow path cross-sectional area of the auxiliary communication path upon a close state of the main valve is a half or less of the flow path cross-sectional area of the auxiliary communication path upon a full open state of the main valve. According to this preferable configuration, since the flow rate of the Pc port and the Ps port decreases during normal control, controllability is good.

It might be preferable that the auxiliary communication path is a communication hole which is formed in the hollow tube member and communicates with the hollow communication path. According to this preferable configuration, the auxiliary communication path can be formed with a simple structure.

It might be preferable that the main valve element is externally fitted to the hollow tube member with a spring so as to be axially movable, and the main valve element relatively moves with respect to the hollow tube member so as to be capable of closing at least a part of an opening of the communication hole. According to this preferable configuration, since it is possible to change the flow path cross-sectional area of the auxiliary communication path by the corporation between the main valve element and the communication hole, the structure of the main valve element is simple and the movement of the main valve element is smooth.

It might be preferable that the main valve element is internally fitted to the valve housing. According to this preferable configuration, the movement of the main valve element is smoother.

It might be preferable that the main valve element and the hollow tube member are provided with engagement portions capable of engaging with each other in accordance with a relative movement between the main valve element and the hollow tube member. According to this preferable configuration, since the movement position of the main valve element with respect to the hollow tube member in the closing and opening direction of the communication hole is regulated by the engagement portions, the structure is simple.

DESCRIPTION OF EMBODIMENTS

A mode for implementing a capacity control valve according to the present invention will be described below on the basis of embodiments.

First Embodiment

A capacity control valve according to a first embodiment will be described with reference to FIGS. 1 to 8. Hereinafter, the left and right sides as viewed from the front side in FIG. 2 will be described as the left and right sides of the capacity control valve.

A capacity control valve V of the present invention is incorporated in a variable displacement compressor M used in an air conditioning system of an automobile or the like and variably controls a pressure of a working fluid (hereinafter, simply referred to as a "fluid") which is a refrigerant so that a discharge amount of the variable displacement compressor M is controlled to adjust the air conditioning system to a desired cooling capacity.

Figure 1:
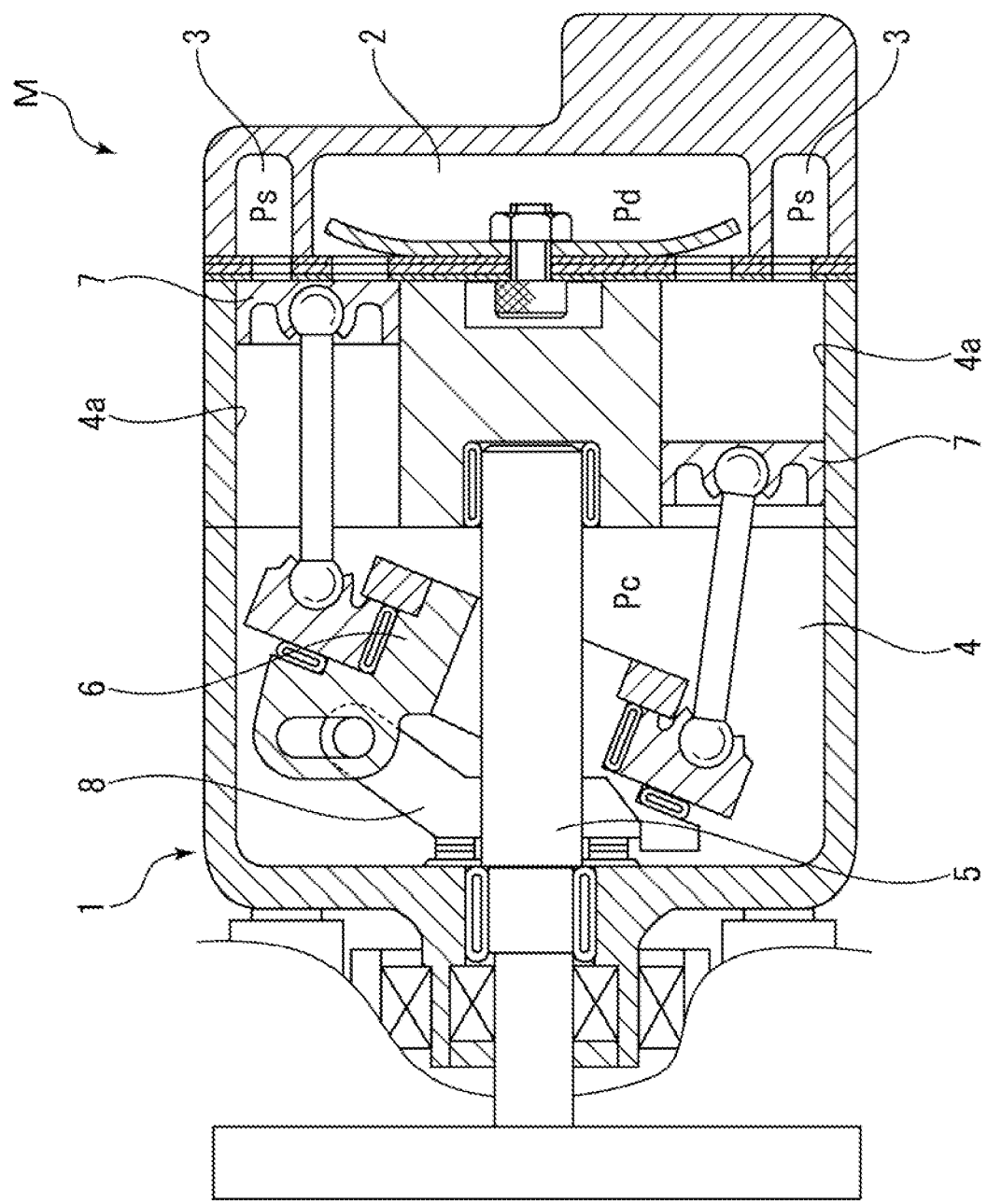
FIG. 1 is a schematic configuration diagram illustrating a swash plate type variable displacement compressor incorporated with a capacity control valve according to a first embodiment of the present invention.

First, the variable displacement compressor M will be described. As illustrated in FIG. 1, the variable displacement compressor M includes a casing 1 having a discharge chamber 2, a suction chamber 3, a control chamber 4, and a plurality of cylinders 4a. In addition, the variable displacement compressor M is provided with a communication path (not illustrated) allowing the control chamber 4 and the suction chamber 3 to directly communicate with each other and this communication path is provided with a fixed orifice for adjusting a pressure between the suction chamber 3 and the control chamber 4 in a balanced state.

Further, the variable displacement compressor M includes a rotating shaft 5 which is rotationally driven by an engine (not illustrated) installed outside the casing 1, a swash plate 6 which is eccentrically connected to the rotating shaft 5 inside the control chamber 4 by a hinge mechanism 8, and a plurality of pistons 7 which are connected to the swash plate 6 and are fitted so as to be movable in a reciprocating manner inside the respective cylinders 4a and continuously changes an inclination angle of the swash plate 6 by appropriately controlling a pressure inside the control chamber 4 while using a suction pressure Ps of the suction chamber 3 sucking a fluid by using the capacity control valve V driven to be opened and closed by an electromagnetic force, a discharge pressure Pd of the discharge chamber 2 discharging a fluid pressurized by the piston 7, and a control pressure Pc of the control chamber 4 accommodating the swash plate 6 so that a stroke amount of the piston 7 is changed to control a discharge amount of the fluid. Further, for convenience of description, the capacity control valve V incorporated in the variable displacement compressor M is omitted in FIG. 1.

Specifically, the inclination angle of the swash plate 6 with respect to the rotating shaft 5 becomes smaller so that the stroke amount of the piston 7 decreases as the control pressure Pc inside the control chamber 4 becomes higher. However, when the pressure becomes a certain level or more, the swash plate 6 is substantially perpendicular to the rotating shaft 5, that is, slightly inclined from the vertical direction. At this time, since the stroke amount of the piston 7 is minimized and the pressurization of the fluid inside the cylinder 4a by the piston 7 is minimized, the discharge amount of the fluid to the discharge chamber 2 decreases and the cooling capacity of the air conditioning system is minimized. On the other hand, the inclination angle of the swash plate 6 with respect to the rotating shaft 5 becomes larger so that the stroke amount of the piston 7 increases as the control pressure Pc inside the control chamber 4 becomes lower. However, when the pressure becomes a certain level or less, the inclination angle of the swash plate 6 with respect to the rotating shaft 5 is maximized. At this time, since the stroke amount of the piston 7 is maximized and the pressurization of the fluid inside the cylinder 4a by the piston 7 is maximized, the discharge amount of the fluid to the discharge chamber 2 increases and the cooling capacity of the air conditioning system is maximized.

Figure 2:
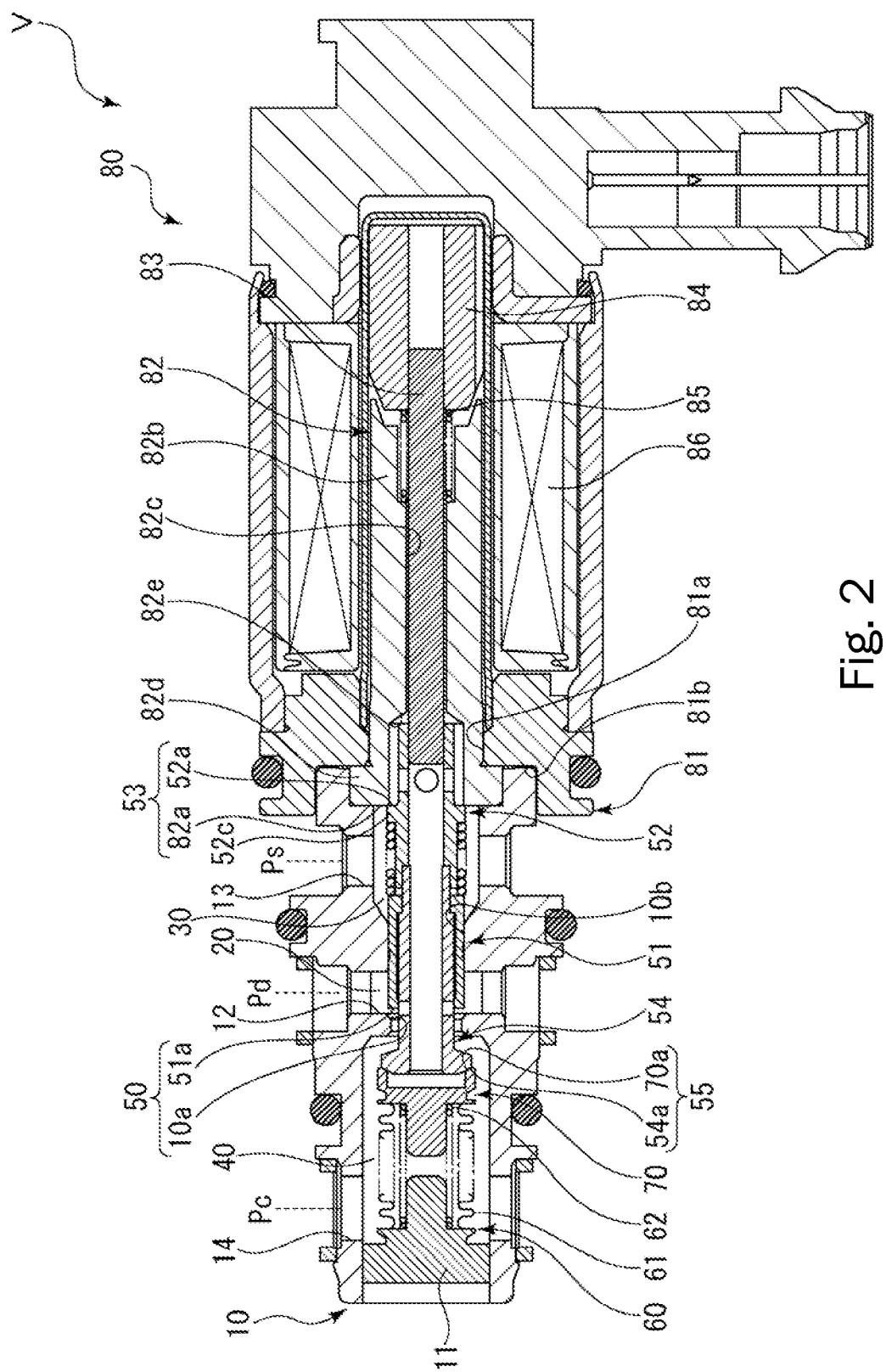
FIG. 2 is a cross-sectional view illustrating a state in which a first valve is opened in a non-energized state of the capacity control valve according to the first embodiment.

As illustrated in FIG. 2, the capacity control valve V incorporated in the variable displacement compressor M adjusts a current flowing through a coil 86 constituting a solenoid 80 so as to control the opening and closing of a first valve 50 and a second valve 53 which are main valves of the capacity control valve V and to control the opening and closing of a pressure-sensitive valve 55 by an ambient fluid pressure so that the fluid flowing into the control chamber 4 or flowing out from the control chamber 4 is controlled to variably control the control pressure Pc inside the control chamber 4.

In the present embodiment, the first valve 50 includes a main valve element 51 and a first valve seat 10a which is a main valve seat formed on an inner peripheral surface of a valve housing 10 and a first valve portion 51a which is a main valve portion formed in a left axial end of the main valve element 51 comes into contact with and separates from the first valve seat 10a. The second valve 53 includes a second valve element 52 which is a hollow tube member and a second valve seat 82a which is formed in a left axial end surface corresponding to an opening end surface of the fixed iron core 82 and a second valve portion 52a which is formed in a right axial end surface of an annular flange portion 52c extending outward in the radial direction from the outer peripheral surface of the substantially axial center of the second valve element 52 comes into contact with and separates from the second valve seat 82a. The pressure-sensitive valve 55 includes an adapter 70 of a pressure-sensitive element 60 and a pressure-sensitive valve seat 54a which is formed in a left axial end portion of a pressure-sensitive valve member 54 corresponding to a hollow tube member and a right axial end 70a of the adapter 70 comes into contact with and separates from the pressure-sensitive valve seat 54a.

Next, a structure of the capacity control valve V will be described. As illustrated in FIG. 2, the capacity control valve V mainly includes the valve housing 10 which is formed of a metal material or a resin material, the main valve element 51, the second valve element 52, and the pressure-sensitive valve member 54 which are disposed (i.e., internally fitted) so as to be movable in a reciprocating manner in the axial direction inside the valve housing 10, the pressure-sensitive element 60 which applies a biasing force to the main valve element 51, the second valve element 52, and the pressure-sensitive valve member 54 rightward in the axial direction in response to an ambient fluid pressure, and the solenoid 80 which is connected to the valve housing 10 and applies a drive force to the main valve element 51, the second valve element 52, and the pressure-sensitive valve member 54.

As illustrated in FIG. 2, the solenoid 80 mainly includes a casing 81 which has an opening portion 81a opening leftward in the axial direction, a substantially cylindrical fixed iron core 82 which is inserted into the opening portion 81a of the casing 81 from the left side in the axial direction and is fixed to the inner radial side of the casing 81, a drive rod 83 which is fixed to the inner radial side of the fixed iron core 82 so as to be movable in a reciprocating manner in the axial direction and of which a left axial end portion is connected and fixed to the second valve element 52, a movable iron core 84 which is fixed to a right axial end portion of the drive rod 83, a coil spring 85 which is provided between the fixed iron core 82 and the movable iron core 84 and urges the movable iron core 84 rightward in the axial direction, and an excitation coil 86 which is wound on the outside of the fixed iron core 82 through a bobbin.

The casing 81 is provided with a concave portion 81b which is recessed rightward in the axial direction from the radial center of the left axial end and the right axial end portion of the valve housing 10 is inserted and fixed to the concave portion 81b.

The fixed iron core 82 includes a cylindrical portion 82b which is formed of a rigid element corresponding to a magnetic material such as iron or silicon steel and is provided with an insertion hole 82c extending in the axial direction and allowing the drive rod 83 to be inserted therethrough and an annular flange portion 82d which extends outward in the radial direction from the outer peripheral surface of the left axial end portion of the cylindrical portion 82b and a concave portion 82e is formed so as to be recessed rightward in the axial direction from the radial center of the left axial end of the cylindrical portion 82b.

As illustrated in FIG. 2, the valve housing 10 has a substantially cylindrical shape with a bottom by press-inserting a partition adjustment member 11 into the left axial end portion. The main valve element 51, the second valve element 52, and the pressure-sensitive valve member 54 are disposed inside the valve housing 10 so as to be movable in a reciprocating manner in the axial direction and a guide surface 10b having a small diameter and slidable in the outer peripheral surface of the main valve element 51 is formed in a part of the inner peripheral surface of the valve housing 10. In addition, the partition adjustment member 11 can adjust the urging force of the pressure-sensitive element 60 by adjusting the installation position of the valve housing 10 in the axial direction.

Further, a first valve chamber 20 in which a left axial side corresponding to the side of the first valve portion 51a of the main valve element 51 is disposed, a second valve chamber 30 which is formed on the right axial side corresponding to a back pressure side of the main valve element 51, and a pressure-sensitive chamber 40 which is formed at a position on the side opposite to the second valve chamber 30 in the axial direction with respect to the first valve chamber 20 are formed inside the valve housing 10. In addition, the second valve chamber 30 is defined by the outer peripheral surface on the back pressure side of the main valve element 51, the outer peripheral surface of the second valve element 52, the concave portion 82e and the left axial end surface corresponding to the opening end surface of the fixed iron core 82, and the right axial inner peripheral surface in relation to the guide surface 10b of the valve housing 10.

Further, the valve housing 10 is provided with a Pd port 12 which communicates the first valve chamber 20 with the discharge chamber 2 of the variable displacement compressor M, a Ps port 13 which communicates the second valve chamber 30 with the suction chamber 3 of the variable displacement compressor M, and a Pc port 14 which communicates the pressure-sensitive chamber 40 with the control chamber 4 of the variable displacement compressor M.

Figure 3:
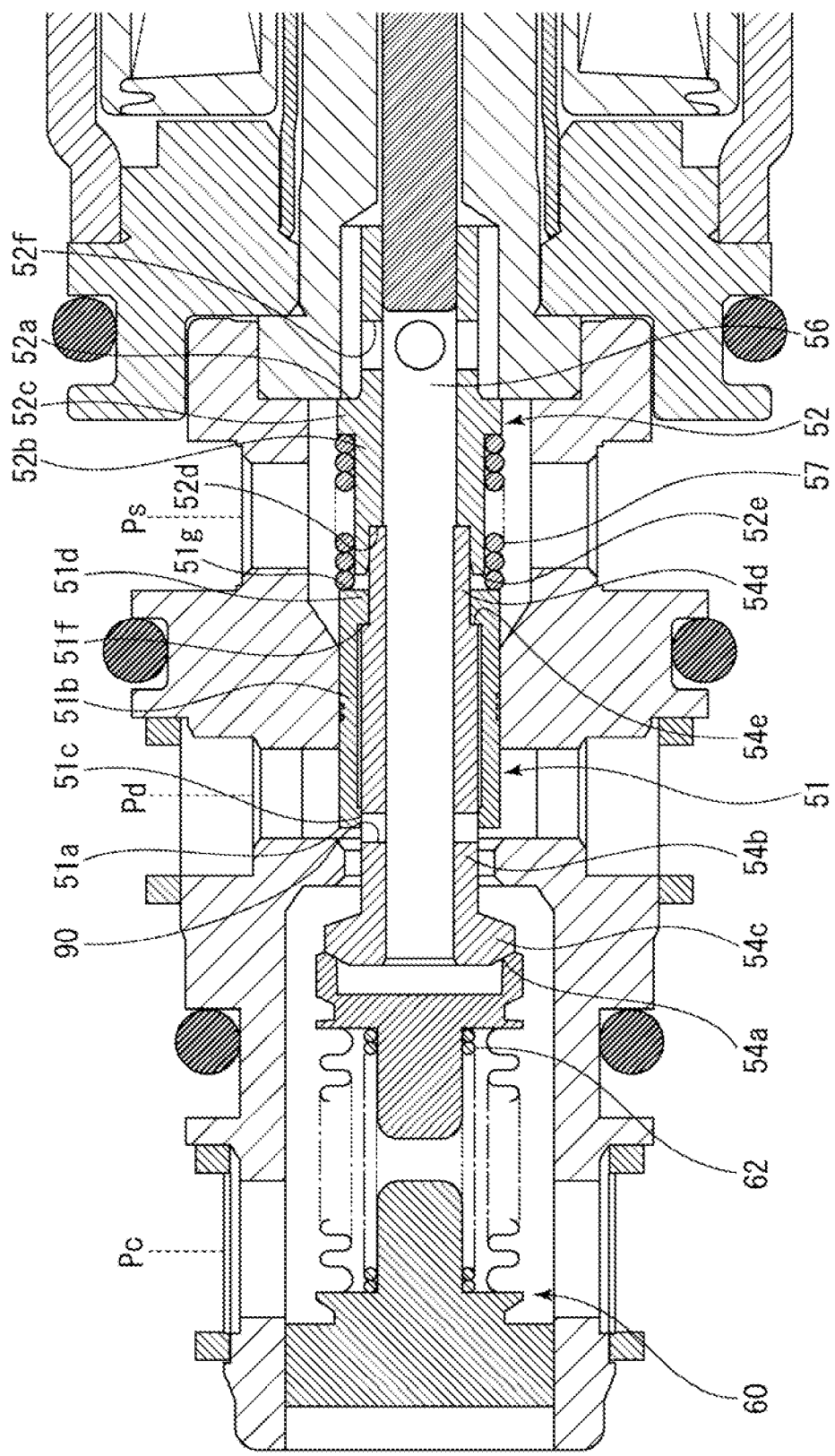
FIG. 3 is an enlarged cross-sectional view of FIG. 2 illustrating a state in which the first valve is opened in the non-energized state of the capacity control valve according to the first embodiment.

Next, each of the main valve element 51, the second valve element 52, and the pressure-sensitive valve member 54 will be described. As illustrated in FIG. 3, the main valve element 51 is formed in a cylindrical shape, includes a cylindrical portion 51b, the first valve portion 51a which is formed on the outer radial side of the left axial end of the cylindrical portion 51b, a sliding portion 51c which protrudes in an annular shape inward in the radial direction from the inner peripheral surface of the left axial end portion of the cylindrical portion 51b and is formed such that the inner diameter is smaller than the cylindrical portion 51b, and a regulation portion 51d which protrudes in an annular shape inward in the radial direction from the inner peripheral surface of the right axial end portion of the cylindrical portion 51b and is formed such that the inner diameter is smaller than the sliding portion 51c, and is externally fitted to the pressure-sensitive valve member 54 so as to be movable in the axial direction. In addition, since the inner diameter of the sliding portion 51c is small, an annular gap is formed between the inner peripheral surface of the cylindrical portion 51b and an outer peripheral surface of a cylindrical portion 54b of the pressure-sensitive valve member 54 so as to separate them in the radial direction while the main valve element 51 is externally fitted to the pressure-sensitive valve member 54 and the main valve element 51 is easily relatively movable in the axial direction with respect to the pressure-sensitive valve member 54.

As illustrated in FIG. 3, the pressure-sensitive valve member 54 is formed in a substantially cylindrical shape and a substantially turret shape in the side view and includes the cylindrical portion 54b, a flange portion 54c which extends outward in the radial direction from the outer peripheral surface of the left axial end portion of the cylindrical portion 54b and has the pressure-sensitive valve seat 54a formed in the left axial end, and an attachment portion 54d which is formed in the right axial end portion of the cylindrical portion 54b and has a diameter smaller than the cylindrical portion 54b and the cylindrical portion 54b is formed such that the outer diameter is slightly smaller than the inner diameter of the sliding portion 51c of the main valve element 51. Further, the attachment portion 54d is formed such that the outer diameter is slightly smaller than the inner diameter of the regulation portion 51d of the main valve element 51 and the axial dimension is longer than the regulation portion 51d of the main valve element 51.

Accordingly, the attachment portion 54d of the pressure-sensitive valve member 54 is inserted and fitted to the inner radial side of the regulation portion 51d of the main valve element 51 so as to be movable in the axial direction while the main valve element 51 is externally fitted to the pressure-sensitive valve member 54 so that the right axial end portion of the attachment portion 54d protrudes from the right axial opening portion of the regulation portion 51d of the main valve element 51 and an end surface 54e corresponding to the right axial engagement portion of the cylindrical portion 54b of the pressure-sensitive valve member 54 can engage with a regulation end surface 51f corresponding to the left axial engagement portion of the regulation portion 51d of the main valve element 51.

As illustrated in FIG. 3, the second valve element 52 is formed in a substantially cylindrical shape with a flange and includes a cylindrical portion 52b, the annular flange portion 52c which extends outward in the radial direction from the outer peripheral surface of the substantially axial center portion of the cylindrical portion 52b, and an attachment concave portion 52d which is recessed rightward in the axial direction from the radial center of the left axial end of the cylindrical portion 52b and the right axial end portion of the attachment portion 54d of the pressure-sensitive valve member 54 is inserted and fixed to the attachment concave portion 52d so that the second valve element 52 and the pressure-sensitive valve member 54 are integrally connected to each other. Further, the drive rod 83 is connected and fixed to the right axial end portion of the second valve element 52 and the main valve element 51, the second valve element 52, and the pressure-sensitive valve member 54 are movable together in the axial direction.

Further, a coil spring 57 which is a spring is externally fitted to the left axial cylindrical portion 52b in relation to the flange portion 52c of the second valve element 52, the left axial end of the coil spring 57 comes into contact with an outer radial side of a regulation end surface 51g which is the right axial engagement portion of the regulation portion 51d of the main valve element 51, and the right axial end of the coil spring 57 comes into contact with the left axial end surface of the flange portion 52c of the second valve element 52. In addition, the coil spring 57 applies a biasing force leftward in the axial direction so that the left axial regulation end surface 51f of the regulation portion 51d of the main valve element 51 engages with the right axial end surface 54e of the cylindrical portion 54b of the pressure-sensitive valve member 54. Further, the spring constant of the coil spring 57 is set to be smaller than that of a coil spring 62 provided in the pressure-sensitive element 60.

Further, since the second valve element 52 and the pressure-sensitive valve member 54 are integrally connected to each other, an annular groove 58 (see FIG. 7) is formed in the outer periphery of the attachment portion 54d of the pressure-sensitive valve member 54 to which the regulation portion 51d of the main valve element 51 is externally fitted. The groove 58 is formed by the outer peripheral surface of the attachment portion 54d of the pressure-sensitive valve member 54, the right axial end surface 54e of the cylindrical portion 54b of the pressure-sensitive valve member 54, and a left axial end surface 52e of the cylindrical portion 52b of the second valve element 52 and the axial position of the main valve element 51, that is, the regulation portion 51d relatively moving in the axial direction with respect to the second valve element 52 and the pressure-sensitive valve member 54 is determined by the groove 58.

Figure 7A:
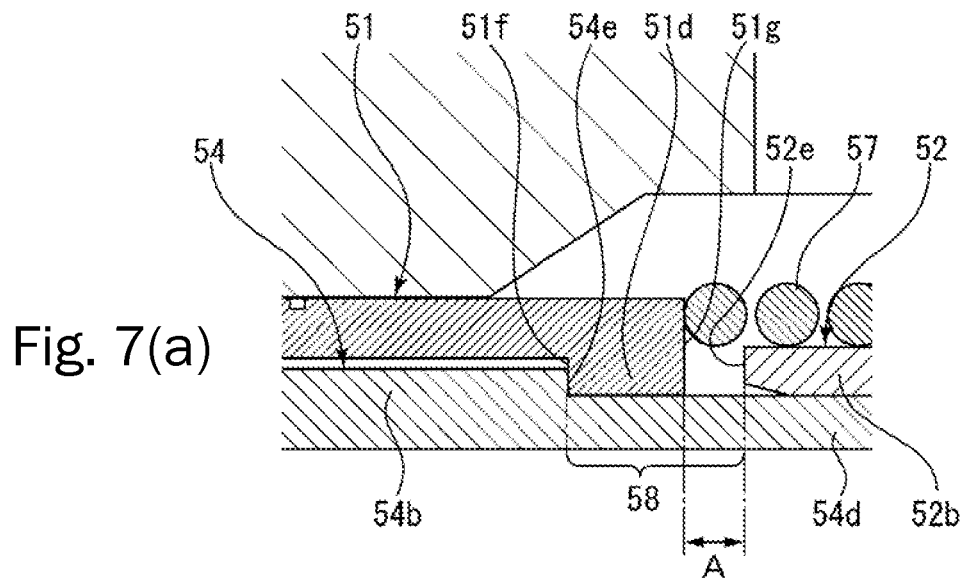
FIGS. 7A to 7C are enlarged cross-sectional views illustrating an engagement state of a regulation portion of a main valve element in a groove formed in a second valve element and a pressure-sensitive valve member in the capacity control valve according to the first embodiment.
Figure 7B:
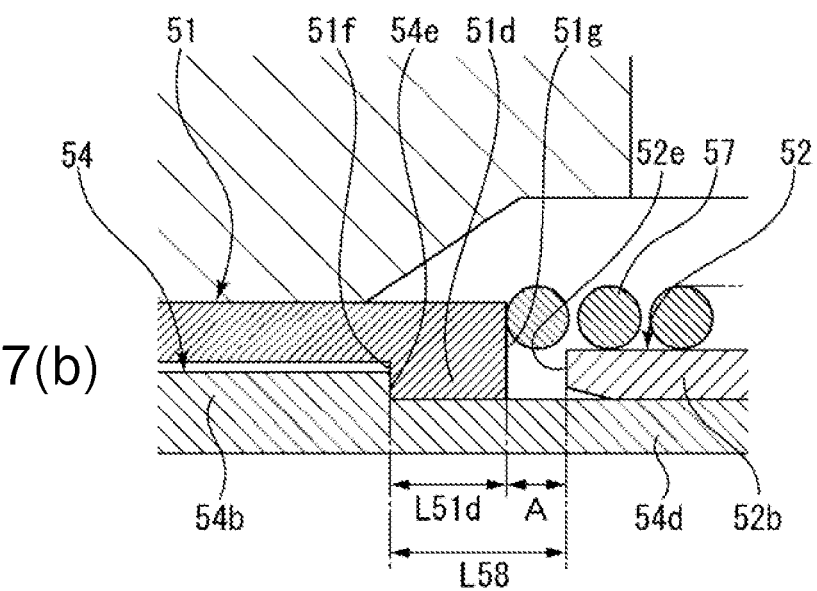

Further, an axial dimension L58 of the groove 58 is obtained by combining an axial dimension L51d of the regulation portion 51d of the main valve element 51 and an axial separation dimension A corresponding to an axial dimension of a gap between the regulation portion 51d of the main valve element 51 and the groove 58 (i.e., L58=L51d+A, see FIG. 7B).

Accordingly, in a state in which the left axial regulation end surface 51f of the regulation portion 51d of the main valve element 51 comes into contact with the right axial end surface 54e of the cylindrical portion 54b of the pressure-sensitive valve member 54 by the urging force of the coil spring 57, the right axial end of the main valve element 51, that is, the right axial regulation end surface 51g of the regulation portion 51d of the main valve element 51 is separated from the left axial end of the second valve element 52, that is, the end surface 52e corresponding to the left axial engagement portion of the cylindrical portion 52b of the second valve element 52 by an axial dimension A (see FIG. 7A). In addition, in the present embodiment, the axial separation dimension A between the regulation end surface 51g of the main valve element 51 and the end surface 52e of the second valve element 52 is set to a dimension of a substantially half of the right axial side of the opening of the communication hole 90 corresponding to the auxiliary communication path to be described later. That is, the pressure-sensitive valve member 54 is further movable in the axial direction by the separation dimension A after the first valve 50 is closed.

Further, a hollow communication path 56 which penetrates in the axial direction by connecting a hollow hole is formed inside the second valve element 52 and the pressure-sensitive valve member 54. In addition, the hollow communication path 56 communicates with the inside of the concave portion 82e of the fixed iron core 82 through a plurality of through-holes 52f penetrating the right axial cylindrical portion 52b in relation to the flange portion 52c of the second valve element 52 in the radial direction. Further, the hollow communication path 56 communicates with the first valve chamber 20 and/or the pressure-sensitive chamber 40 through a plurality of communication holes 90 penetrating the left axial end portion of the cylindrical portion 54b of the pressure-sensitive valve member 54 in the radial direction.

Figure 8A:
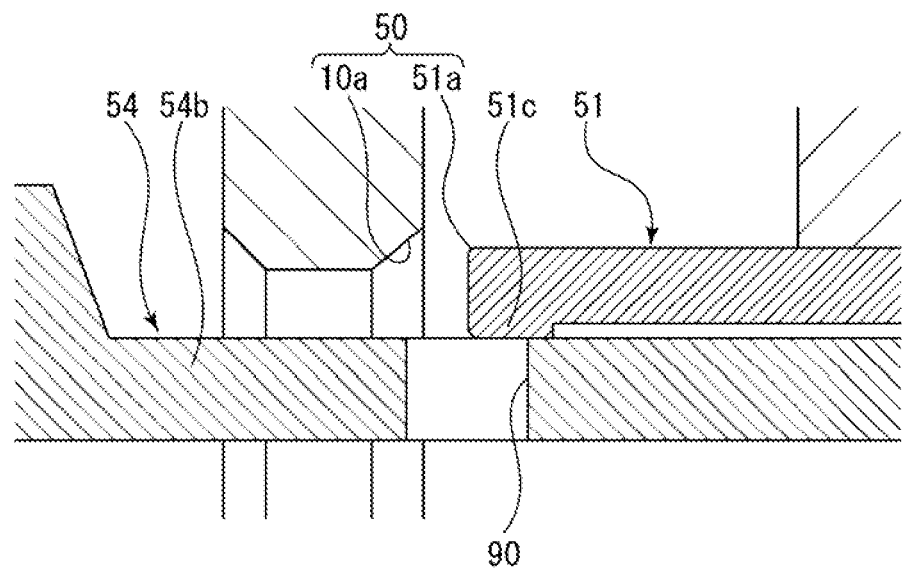
FIGS. 8A to 8C are enlarged cross-sectional views illustrating a state in which the communication hole of the capacity control valve according to the first embodiment is opened and closed.

Further, as illustrated in FIG. 3, in a state in which the left axial regulation end surface 51f of the regulation portion 51d of the main valve element 51 comes into contact with the right axial end surface 54e of the cylindrical portion 54b of the pressure-sensitive valve member 54 by the urging force of the coil spring 57, a substantially half of the right axial side of the opening, preferably, a half or more of the opening of the communication hole 90 is closed by the sliding portion 51c of the main valve element 51 externally fitted to the pressure-sensitive valve member 54 (see FIG. 8A).

As illustrated in FIG. 2, the pressure-sensitive element 60 mainly includes the bellows core 61 in which the coil spring 62 is embedded and the adapter 70 which is formed in the right axial end portion of the bellows core 61 and the left axial end of the bellows core 61 is fixed to the partition adjustment member 11.

Further, the pressure-sensitive element 60 is disposed inside the pressure-sensitive chamber 40 and the right axial end 70a of the adapter 70 sits on the pressure-sensitive valve seat 54a of the pressure-sensitive valve member 54 by the urging force of the coil spring 62 and the bellows core 61. In addition, the pressure-sensitive element 60 contracts due to an ambient fluid pressure when the suction pressure Ps inside the hollow communication path 56 is high so as to separate the right axial end 70a of the adapter 70 from the pressure-sensitive valve seat 54a of the pressure-sensitive valve member 54 and open the pressure-sensitive valve 55 (see FIGS. 4 and 5). Accordingly, for example, when the suction pressure Ps inside the second valve chamber 30 is high, the control pressure Pc can be promptly released to the second valve chamber 30 through the hollow communication path 56 and the through-hole 52f of the second valve element 52.

Next, a case in which the non-energized state of the capacity control valve V is maintained will be described. As illustrated in FIG. 2, when the capacity control valve V is in the non-energized state, the movable iron core 84 is pressed rightward in the axial direction by the urging force of the coil spring 85 constituting the solenoid 80 or the urging force of the bellows core 61 of the coil spring 62 so that the drive rod 83, the main valve element 51, the second valve element 52, and the pressure-sensitive valve member 54 move rightward in the axial direction and the second valve portion 52a of the second valve element 52 sits on the second valve seat 82a of the fixed iron core 82 so as to close the second valve 53. At this time, the first valve portion 51a of the main valve element 51 is separated from the first valve seat 10a formed on the inner peripheral surface of the valve housing 10 so as to open the first valve 50. In addition, when the first valve 50 is in the open state, the left axial regulation end surface 51f of the regulation portion 51d of the main valve element 51 engages with the right axial end surface 54e of the cylindrical portion 54b of the pressure-sensitive valve member 54 by the urging force of the coil spring 57 (see FIG. 7A) and a substantially half of the right axial side of the opening of the communication hole 90 is closed by the sliding portion 51c of the main valve element 51 externally fitted to the pressure-sensitive valve member 54 (see FIG. 8A).

In this way, when the capacity control valve V is in the non-energized state, a fluid inside the discharge chamber 2 of the variable displacement compressor M flows from the discharge chamber 2 into the control chamber 4 through the capacity control valve V when the first valve 50 is opened. This is because the discharge pressure Pd is higher than the control pressure Pc.

Since the discharge pressure Pd flows into the control chamber 4, the control pressure Pc is higher than the control pressure Pc before the non-energized state, is higher than the suction pressure Ps, and is expressed by a relational expression of Pd≥Pc>Ps. For that reason, a fluid inside the control chamber 4 flows into the suction chamber 3 through the communication path and the fixed orifice directly communicating the control chamber 4 with the suction chamber 3. The inflow of the fluid is performed until the discharge pressure Pd, the suction pressure Ps, and the control pressure Pc are equalized. For that reason, when the capacity control valve V is left in the non-energized state for a long time, the discharge pressure Pd, the suction pressure Ps, and the control pressure Pc are equalized (i.e., Pd=Pc=Ps) and the suction pressure Ps and the control pressure Pc are much higher than the pressure in the continuous driving state. At this time, a part of a fluid inside the control chamber 4 may be liquefied. In addition, since the pressure-sensitive element 60 contracts by the suction pressure Ps which is much higher than that in the continuous driving state, the right axial end 70a of the adapter 70 is separated from the pressure-sensitive valve seat 54a of the pressure-sensitive valve member 54 so that the pressure-sensitive valve 55 is opened (see FIGS. 4 and 5).

Next, a case until a liquefied fluid is discharged from the control chamber 4 when starting the variable displacement compressor M will be described.

Figure 4:
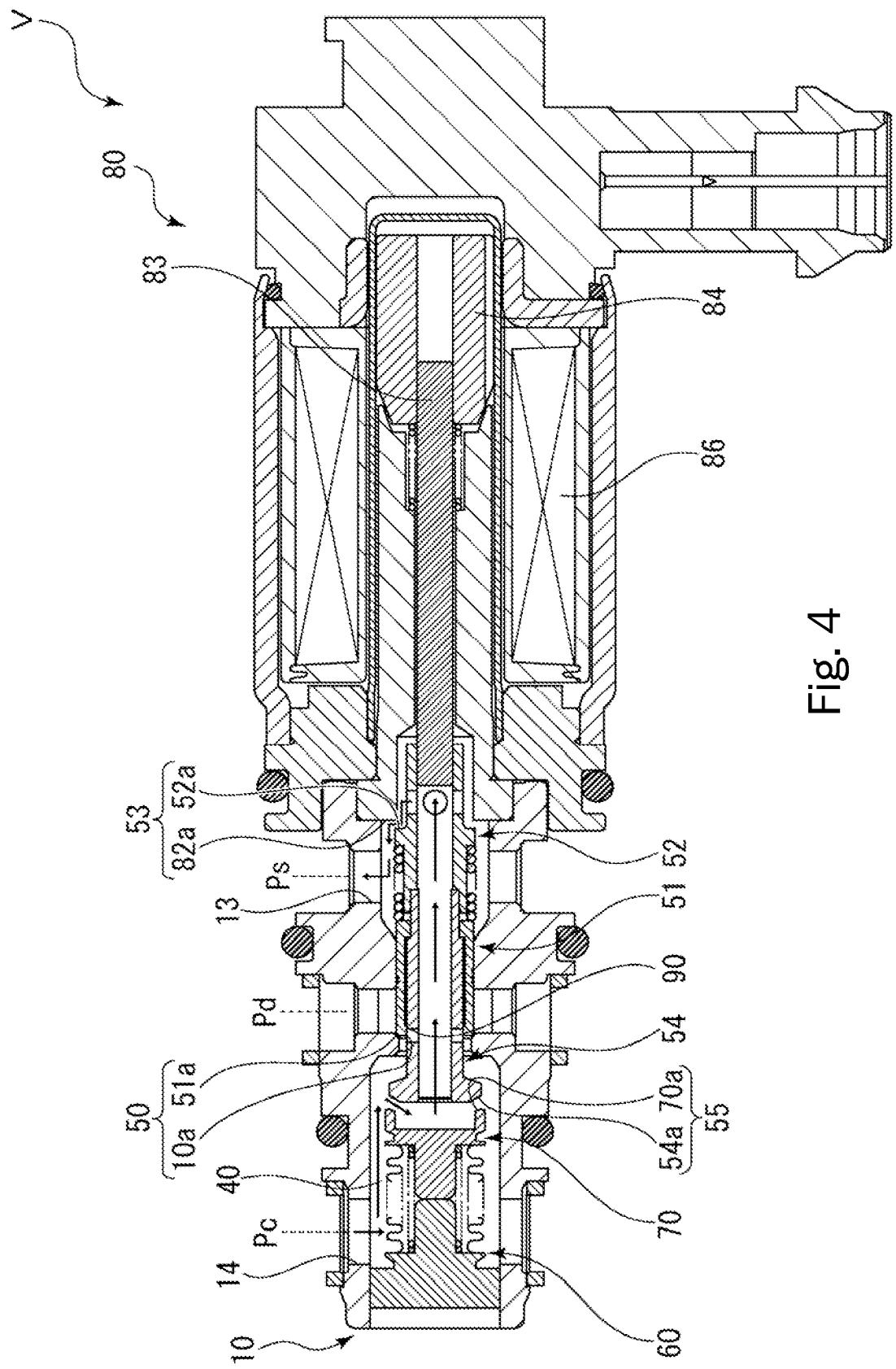
FIG. 4 is a cross-sectional view illustrating a state in which the first valve is closed and a pressure-sensitive valve is opened in an energized state (e.g., a start-up state) of the capacity control valve according to the first embodiment.

When the coil 86 of the solenoid 80 is energized and excited to generate a magnetic force from the non-energized state of the capacity control valve V (e.g., a state in which the first valve 50 is opened) illustrated in FIGS. 2 and 3, the main valve element 51, the second valve element 52, and the pressure-sensitive valve member 54 move leftward in the axial direction so that the first valve portion 51a of the main valve element 51 sits on the first valve seat 10a formed on the inner peripheral surface of the valve housing 10 so as to close the first valve 50 (see FIG. 4). At this time, the second valve portion 52a of the second valve element 52 is separated from the second valve seat 82a formed on the opening end surface of the fixed iron core 82 so that the second valve 53 is opened. In addition, the main valve element 51 moves together leftward in the axial direction without relatively moving in the axial direction with respect to the second valve element 52 and the pressure-sensitive valve member 54 by the urging force of the coil spring 57 until the non-energized state is changed to the energized state so that the first valve 50 is closed (see FIGS. 7B and 8B).

Figure 5:
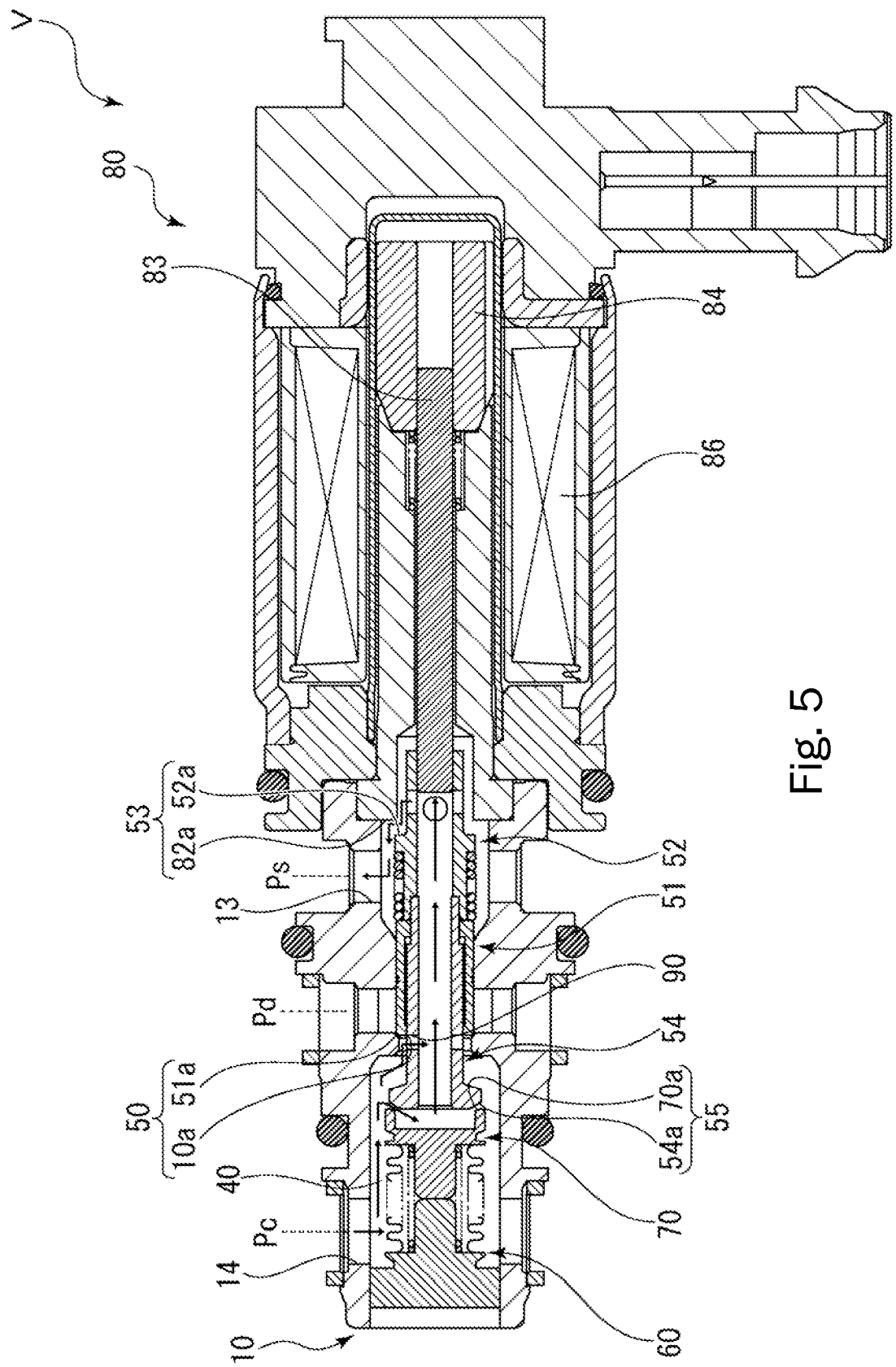
FIG. 5 is a cross-sectional view illustrating a state in which a flow path cross-sectional area of a communication hole is widened from the state of FIG. 4 in the energized state of the capacity control valve according to the first embodiment.

Here, the current for energizing the coil 86 of the solenoid 80 is controlled to increase from the closed state of the first valve 50 and the movable iron core 84 and the drive rod 83 are further moved leftward in the axial direction so that the second valve element 52 and the pressure-sensitive valve member 54 move leftward in the axial direction against the urging force of the coil spring 57 (see FIG. 5). In addition, the present invention is not limited to a drive force generated by the solenoid 80 and even when a force generated by the suction pressure Ps for moving the second valve element 52 and the pressure-sensitive valve member 54 rightward in the axial direction exceeds the urging force of the coil spring 57, the second valve element 52 and the pressure-sensitive valve member 54 move leftward in the axial direction. Further, when the force generated by the suction pressure Ps exceeds the urging force of the pressure-sensitive element 60 applied rightward in the axial direction even when the pressure-sensitive valve 55 is closed, the second valve element 52 and the pressure-sensitive valve member 54 move leftward in the axial direction while contracting the coil spring 57.

Figure 7C:
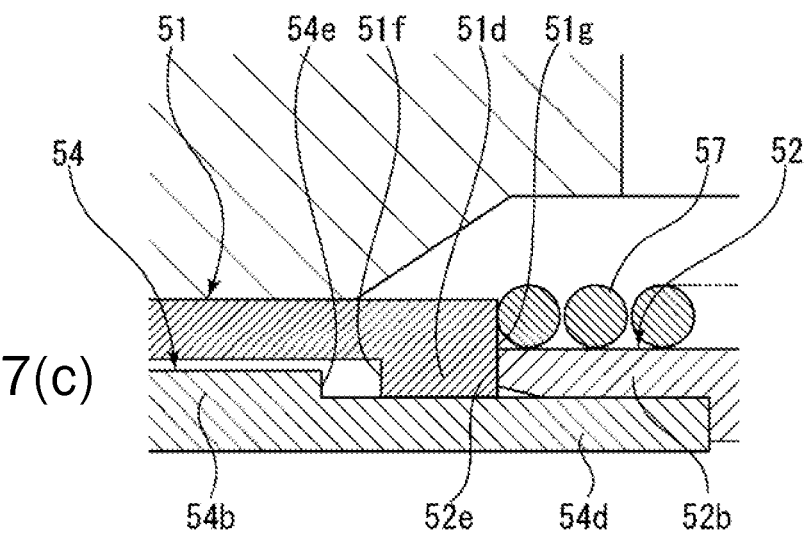

At this time, the main valve element 51 relatively moves rightward in the axial direction by the dimension A with respect to the second valve element 52 and the pressure-sensitive valve member 54 inside the groove 58 formed in the outer periphery of the attachment portion 54d of the pressure-sensitive valve member 54 to an axial position in which the right axial end surface 54e of the cylindrical portion 54b of the pressure-sensitive valve member 54 is separated from the left axial regulation end surface 51f of the regulation portion 51d of the main valve element 51 in the axial direction so as to release the engagement and the right axial regulation end surface 51g of the regulation portion 51d of the main valve element 51 engages with the left axial end surface 52e of the cylindrical portion 52b of the second valve element 52 (see FIG. 7C). At the same time, the left axial end of the sliding portion 51c of the main valve element 51 moves relatively rightward in the axial direction by the dimension A, that is, the substantially half of the right axial side of the opening of the communication hole 90 to a position not overlapping the communication hole 90 formed in the cylindrical portion 54b of the pressure-sensitive valve member 54 so that the entire opening of the communication hole 90 of the pressure-sensitive valve member 54 is opened (see FIG. 8C).

Further, since the suction pressure Ps of the suction chamber 3 slightly decreases due to the stroke of the piston 7 when starting the variable displacement compressor M, a pressure difference between the control pressure Pc of the control chamber 4 and the suction pressure Ps of the suction chamber 3 generates a flow of a fluid flowing from the Pc port 14 to the hollow communication path 56 through the communication hole 90 and flowing to the Ps port 13 (indicated by a solid arrow in FIGS. 5 and 6) and a flow of a fluid flowing from the inside of the pressure-sensitive chamber 40 to the hollow communication path 56 through the pressure-sensitive valve 55 and flowing to the Ps port 13 (indicated by a solid line in FIGS. 4 and 5).

Accordingly, when starting the variable displacement compressor M, the capacity control valve V of the present embodiment opens the pressure-sensitive valve 55 communicating with the hollow communication path 56 and relatively moves the main valve element 51 in the axial direction with respect to the second valve element 52 and the pressure-sensitive valve member 54 so as to increase the flow path cross-sectional area of the communication hole 90 communicating with the hollow communication path 56. In this way, it is possible to improve responsiveness during start-up by discharging a liquefied fluid in a short time. Further, since the pressure-sensitive element 60 expands when a liquefied refrigerant is discharged and the suction pressure Ps decreases, the right axial end 70a of the adapter 70 sits on the pressure-sensitive valve seat 54a of the pressure-sensitive valve member 54. Accordingly, since the wide flow path cross-sectional area of the communication hole 90 can be maintained even when the suction pressure Ps is low and the pressure-sensitive valve 55 is not opened, it is possible to reliably discharge a liquefied fluid (see FIG. 6).

Figure 6:
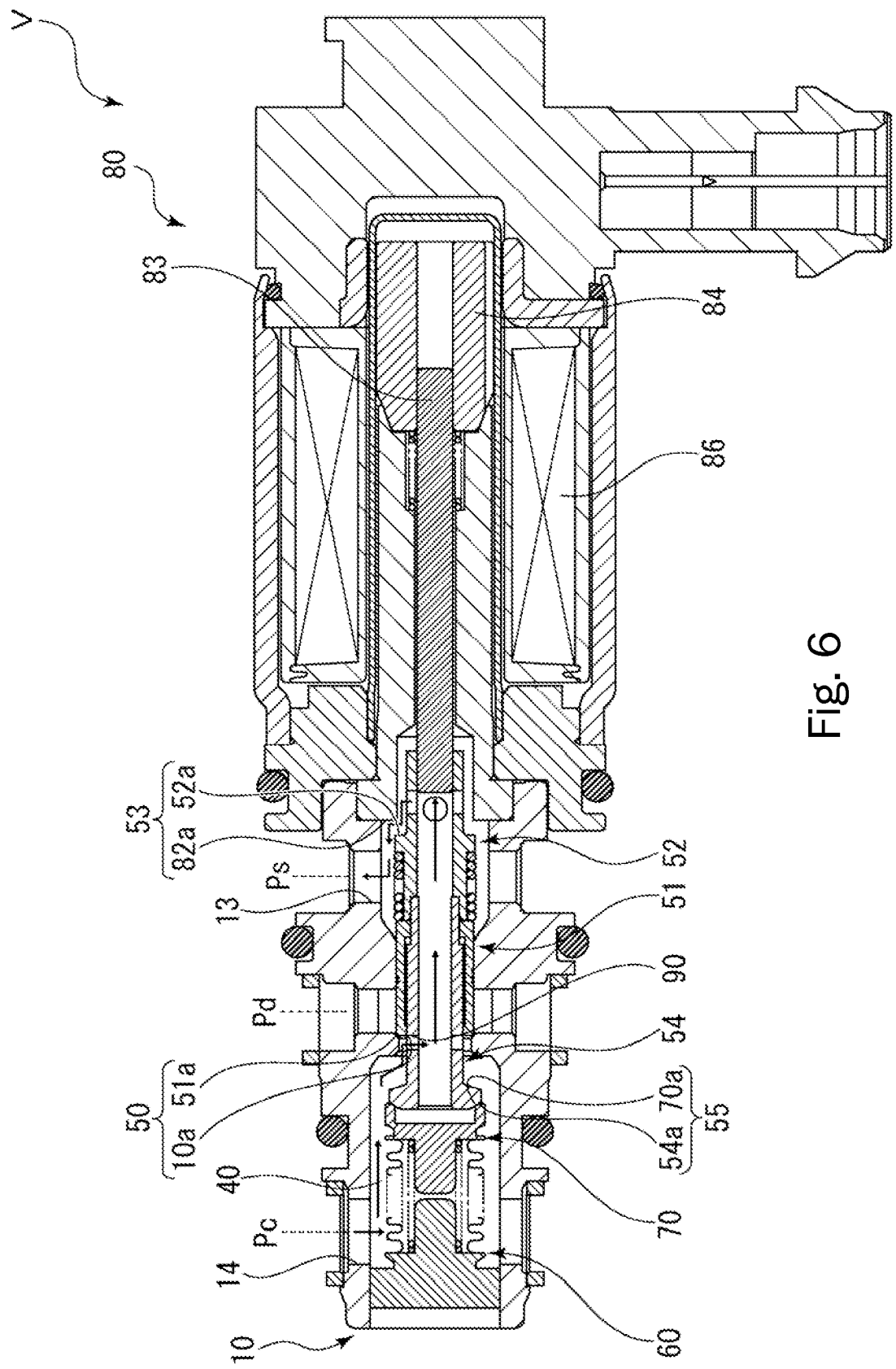
FIG. 6 is a cross-sectional view illustrating a state in which the pressure-sensitive valve is closed from the state of FIG. 5 in the energized state of the capacity control valve according to the first embodiment.

Next, the case of the normal control of the capacity control valve V in the continuous driving state of the variable displacement compressor M will be described. Here, the case of performing the normal control from the state in which the control pressure Pc and the suction pressure Ps are equalized and the control chamber 4 has a maximum capacity will be described. As illustrated in FIG. 6, in the maximum capacity state, the capacity control valve V closes the first valve 50 and relatively moves the main valve element 51 in the axial direction with respect to the second valve element 52 and the pressure-sensitive valve member 54 so as to maintain the wide flow path cross-sectional area of the communication hole 90. Accordingly, since the Pc port 14 can communicate with the Ps port 13 by the hollow communication path 56 through the communication hole 90, the control pressure Pc and the suction pressure Ps are easily maintained at the equal pressure (i.e., the same pressure). For that reason, it is possible to improve the operation efficiency by stabilizing the stroke of the piston 7 inside the cylinder 4a of the control chamber 4 and maintaining the maximum capacity state.

Figure 8B:
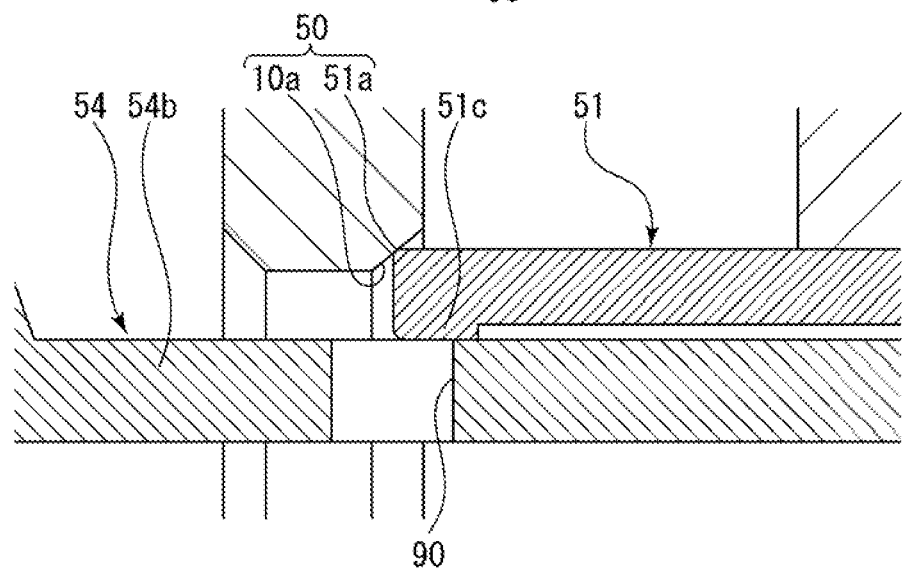
Figure 8C:
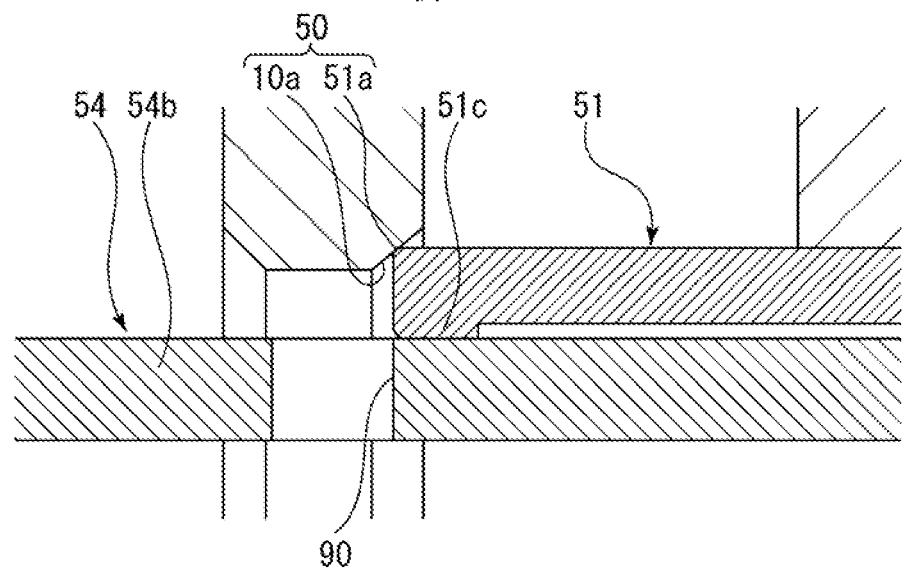

Further, when decreasing the output of the variable displacement compressor M from the maximum capacity state, the current for energizing the coil 86 of the solenoid 80 is controlled to decrease and the main valve element 51 is relatively moved in the axial direction with respect to the second valve element 52 and the pressure-sensitive valve member 54 while the first valve 50 is maintained in a closed state so that the flow path cross-sectional area of the communication hole 90 is narrowed (see FIG. 8B). Accordingly, the flow rate from the Pc port 14 to the Ps port 13 decreases so that the control pressure Pc can be higher than the suction pressure Ps (Pc>Ps). For this reason, since the control pressure Pc of the control chamber 4 can be increased, the output of the variable displacement compressor M can be decreased to a desired output and controllability is high.

Further, since the auxiliary communication path communicating the Pc port 14 with the Ps port 13 is formed by the communication hole 90 of the pressure-sensitive valve member 54 communicating with the hollow communication path 56 separately from the pressure-sensitive valve 55, the auxiliary communication path can be formed in the capacity control valve V with a simple structure. Further, since the communication hole 90 is provided in the small-diameter cylindrical portion 54b of the pressure-sensitive valve member 54, the externally fitted main valve element 51 can be decreased in size.

Further, since the main valve element 51 is externally fitted to the second valve element 52 and the pressure-sensitive valve member 54 through the coil spring 57 so as to be movable in the axial direction and moves relatively in the axial direction with respect to the second valve element 52 and the pressure-sensitive valve member 54 so as to close at least a part of the opening of the communication hole 90, it is possible to change the flow path cross-sectional area of the communication hole 90 by the cooperation between the main valve element 51 and the communication hole 90 and to have a simple structure. Furthermore, since the main valve element 51 is externally fitted to the cylindrical portion 54b of the pressure-sensitive valve member 54 and is internally fitted to the guide surface 10b of the valve housing 10, the movement of the main valve element 51 in the axial direction can be smoothly performed.

Further, since the axial position of the main valve element 51 when opening and closing the communication hole 90 with respect to the second valve element 52 and the pressure-sensitive valve member 54 is regulated by the engagement portion by externally fitting the regulation portion 51d of the main valve element 51 to the groove 58 formed in the outer periphery of the attachment portion 54d of the pressure-sensitive valve member 54, the structure is simple.

Second Embodiment

Figure 9:
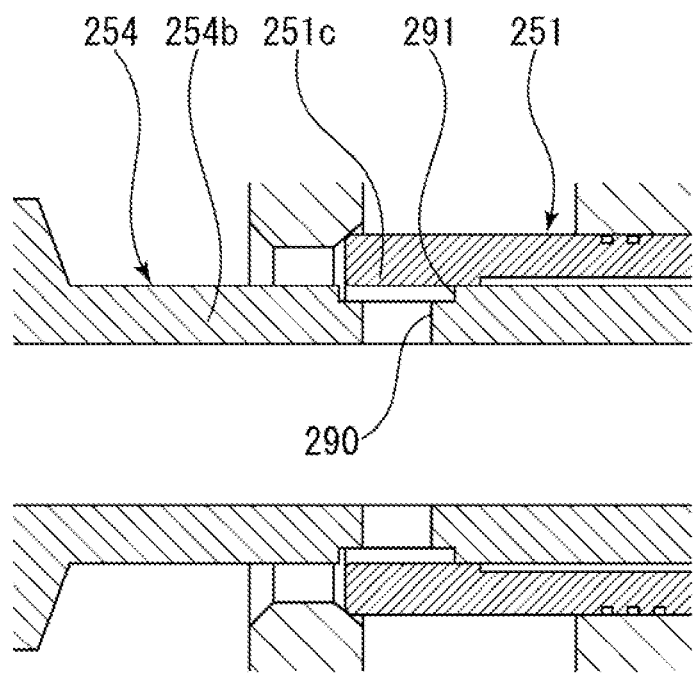
FIG. 9 is an enlarged cross-sectional view illustrating a structure for opening and closing a communication hole of a capacity control valve according to a second embodiment of the present invention.
Figure 10:
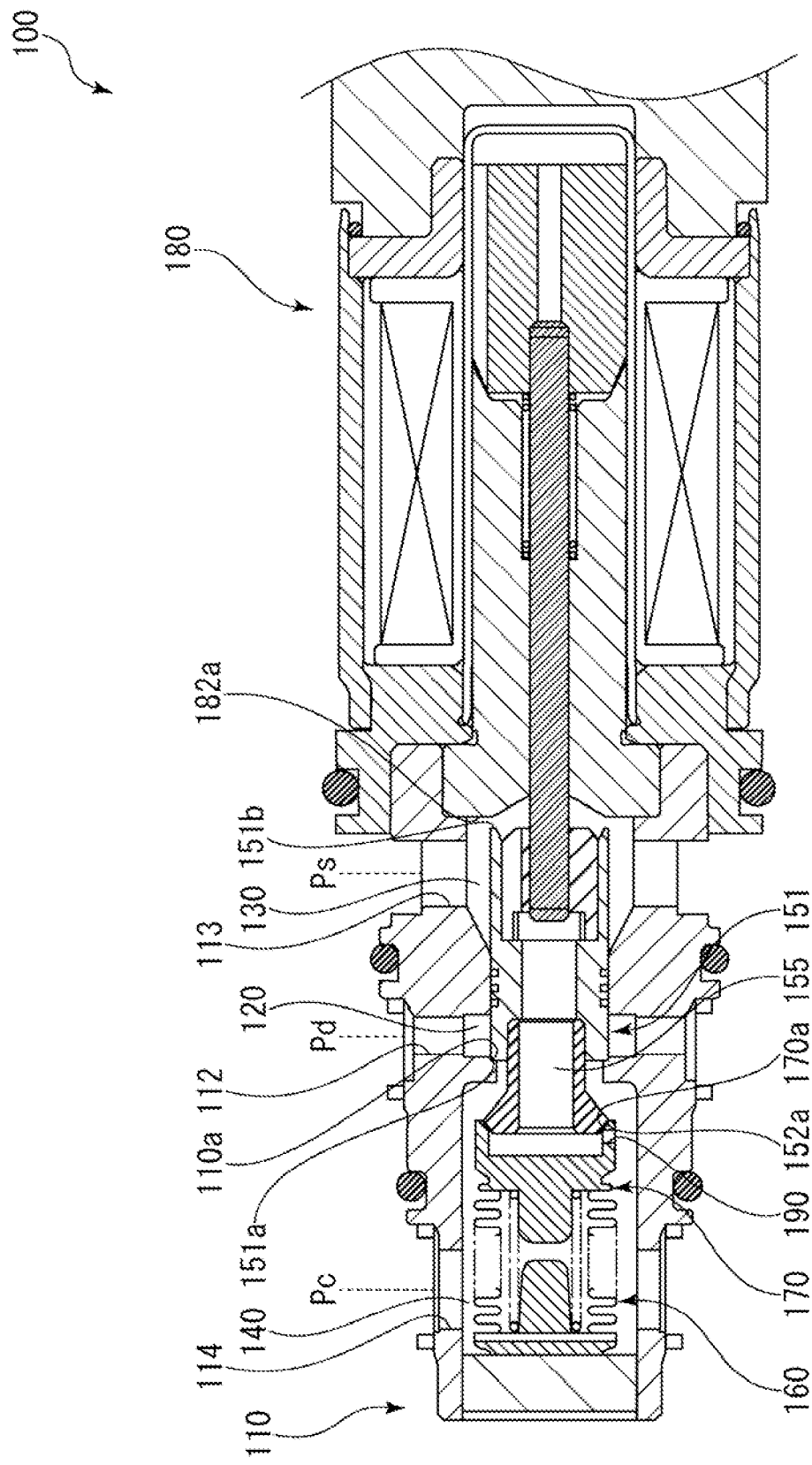
FIG. 10 is a cross-sectional view illustrating a state in which a main valve is closed in an energized state of a capacity control valve of Patent Citation 1 showing a conventional art.

Next, a capacity control valve according to a second embodiment of the present invention will be described with reference to FIG. 9. In addition, the same reference numerals will be given to the same components as those of the above-described embodiment and redundant description will be omitted.

A capacity control valve V of the second embodiment will be described. As illustrated in FIG. 9, in the present embodiment, since a communication hole 290 which is an auxiliary communication path is formed so as to correspond to an axial position of an annular groove portion 291 provided on an outer periphery of a cylindrical portion 254b of a pressure-sensitive valve member 254 to which a sliding portion 251c of a main valve element 251 is externally fitted, a structure that opens and closes the communication hole 290 by the main valve element 251 is a so-called spool valve structure.

Although the embodiments of the present invention have been described above with reference to the drawings, a detailed configuration is not limited to these embodiments and modifications or additions in the scope not departing from the spirit of the present invention are also included in the present invention.

For example, in the above-described embodiments, in the capacity control valve V, the communication hole 90 formed in the cylindrical portion 54b of the pressure-sensitive valve member 54 has been described such that a substantially half of the right axial side of the opening of the communication hole 90 is closed by the sliding portion 51c of the main valve element 51 externally fitted to the pressure-sensitive valve member 54, but the present invention is not limited thereto. For example, the opening of the communication hole 90 may be fully closed by the sliding portion 51c of the main valve element 51.

Further, in the above-described embodiments, a case has been described in which the regulation portion 51d of the main valve element 51 is externally fitted into the groove 58 so that the engagement portions engage with each other and the axial position of the main valve element 51 relatively moving in the axial direction with respect to the second valve element 52 and the pressure-sensitive valve member 54 is determined, but the present invention is not limited thereto. For example, the axial position of the main valve element in the non-energized state may be determined by the engagement between the engagement portion of the regulation portion extending outward in the radial direction from the outer peripheral surface of the cylindrical portion of the main valve element and the engagement portion provided in the inner peripheral surface of the valve housing 10.

Further, the second valve element 52 and the pressure-sensitive valve member 54 constituting the hollow tube member may be integrally formed with each other.

Further, if the auxiliary communication path can increase the flow path cross-sectional area after the first valve portion 51a of the main valve element 51 sits on the first valve seat 10a formed on the inner peripheral surface of the valve housing 10 so that the first valve 50 is closed, the auxiliary communication path may be a through-hole provided in the adapter 70 constituting the pressure-sensitive valve 55 or an axial hole provided in the valve housing 10.

Further, the communication path and the fixed orifice which directly communicate the control chamber 4 and the suction chamber 3 of the variable displacement compressor M with each other may not be provided.

Further, in the above-described embodiments, the second valve may not be provided and the second valve portion 52a of the second valve element 52 may function as a support member that receives an axial load and does not essentially need a sealing function.

Further, the second valve chamber 30 may be provided on the side opposite to the solenoid 80 in the axial direction and the pressure-sensitive chamber 40 may be provided on the side of the solenoid 80.

Further, the coil spring 57 is not limited to a compression spring, but may be a tension spring or have a shape other than a coil shape.

Further, the pressure-sensitive element 60 may not use a coil spring therein.

REFERENCE SIGNS LIST

1 Casing
2 Discharge chamber
3 Suction chamber
4 Control chamber
10 Valve housing
10a First valve seat (main valve seat)
10b Guide surface
11 Partition adjustment member
12 Pd port
13 Ps port
14 Pc port
20 First valve chamber
30 Second valve chamber
40 Pressure-sensitive chamber
50 First valve
51 Main valve element
51a First valve portion (main valve portion)
51b Cylindrical portion
51c Sliding portion
51d Regulation portion
51f Regulation end surface (engagement portion)
51g Regulation end surface (engagement portion)
52 Second valve element (hollow tube member)
52a Second valve portion
52b Cylindrical portion
52c Flange portion
52d Attachment concave portion
52e End surface (engagement portion)
52f Through-hole
53 Second valve
54 Pressure-sensitive valve member (hollow tube member)
54a Pressure-sensitive valve seat
54b Cylindrical portion
54c Flange portion
54d Attachment portion
54e End surface (engagement portion)
55 Pressure-sensitive valve
56 Hollow communication path
57 Coil spring (spring)
58 Groove
60 Pressure-sensitive element
61 Bellows core
62 Coil spring
70 Adapter
70a Right axial end
82 Fixed iron core
82a Second valve seat
90 Communication hole (auxiliary communication path)
251 Main valve element
254 Pressure-sensitive valve member (hollow tube member)
254b Cylindrical portion
290 Communication hole (auxiliary communication path)
291 Annular groove portion
Pc Control pressure
Pd Discharge pressure
Ps Suction pressure
V Capacity control valve

The invention claimed is:

1. A capacity control valve for controlling a capacity of a fluid, comprising:
a valve housing provided with a Pc port, a Pd port and a Ps port;
a main valve formed by a main valve seat and a main valve element having a main valve portion, the main valve being configured to close and open a communication between the Pc port and the Pd port when the main valve portion of the main valve element driven by a drive force of a solenoid comes into contact with and separates from the main valve seat;
a pressure-sensitive valve configured to be opened by an ambient pressure;
a hollow tube member which forms a part of the pressure-sensitive valve and is configured to allow the Pc port to communicate with the Ps port through a hollow communication path formed therein when the pressure-sensitive valve is opened; and
an auxiliary communication path which allows the Pc port to communicate with the Ps port independently of the pressure-sensitive valve,
wherein the auxiliary communication path is configured to be able to increase a flow path cross-sectional area thereof after the main valve is closed.

2. The capacity control valve according to claim 1, wherein the main valve element and the hollow tube member are provided with engagement portions configured to engage with each other in accordance with a relative movement between the main valve element and the hollow tube member.

3. The capacity control valve according to claim 1, wherein the main valve element is internally fitted to the valve housing.

4. The capacity control valve according to claim 3, wherein the main valve element and the hollow tube member are provided with engagement portions configured to engage with each other in accordance with a relative movement between the main valve element and the hollow tube member.

5. The capacity control valve according to claim 1, wherein the auxiliary communication path is a communication hole which is formed in the hollow tube member and communicates with the hollow communication path.

6. The capacity control valve according to claim 5, wherein the main valve element is internally fitted to the valve housing.

7. The capacity control valve according to claim 5, wherein the main valve element and the hollow tube member are provided with engagement portions configured to engage with each other in accordance with a relative movement between the main valve element and the hollow tube member.

8. The capacity control valve according to claim 5,
wherein the main valve element is externally fitted to the hollow tube member with a spring so as to be axially movable, and the main valve element is configured to relatively move with respect to the hollow tube member to close at least a part of an opening of the communication hole.

9. The capacity control valve according to claim 8,
wherein the main valve element is internally fitted to the valve housing.

10. The capacity control valve according to claim 8,
wherein the main valve element and the hollow tube member are provided with engagement portions configured to engage with each other in accordance with a relative movement between the main valve element and the hollow tube member.

11. The capacity control valve according to claim 1,
wherein the flow path cross-sectional area of the auxiliary communication path upon a close state of the main valve is a half or less of the flow path cross-sectional area of the auxiliary communication path upon a full open state of the main valve.

12. The capacity control valve according to claim 11,
wherein the main valve element is internally fitted to the valve housing.

13. The capacity control valve according to claim 11,
wherein the main valve element and the hollow tube member are provided with engagement portions configured to engage with each other in accordance with a relative movement between the main valve element and the hollow tube member.

14. The capacity control valve according to claim 11,
wherein the auxiliary communication path is a communication hole which is formed in the hollow tube member and communicates with the hollow communication path.

15. The capacity control valve according to claim 14,
wherein the main valve element is externally fitted to the hollow tube member with a spring so as to be axially movable, and the main valve element is configured to relatively move with respect to the hollow tube member to close at least a part of an opening of the communication hole.

16. The capacity control valve according to claim 14,
wherein the main valve element is internally fitted to the valve housing.

17. The capacity control valve according to claim 16,
wherein the main valve element and the hollow tube member are provided with engagement portions configured to engage with each other in accordance with a relative movement between the main valve element and the hollow tube member.

* * * * *

UNITED STATES PATENT AND TRADEMARK OFFICE
CERTIFICATE OF CORRECTION

| | | |
|---|---|---|
| PATENT NO. | : 11,873,804 B2 | Page 1 of 1 |
| APPLICATION NO. | : 16/969175 | |
| DATED | : January 16, 2024 | |
| INVENTOR(S) | : Kurihara et al. | |

It is certified that error appears in the above-identified patent and that said Letters Patent is hereby corrected as shown below:

On the Title Page

Page 2, Other Publications, second to last Publication, "International Preliminary Report on Patentability issued in PCT/JP2019/021067, dated Feb. 9, 2021, 6 pages" should be --International Preliminary Report on Patentability issued in PCT/JP2019/031067, dated Feb. 9, 2021, 6 pages--.

Signed and Sealed this
First Day of October, 2024

Katherine Kelly Vidal
*Director of the United States Patent and Trademark Office*